US007349534B2

(12) United States Patent
Joseph et al.

(10) Patent No.: US 7,349,534 B2
(45) **Date of Patent: *Mar. 25, 2008**

(54) CALL ROUTING FROM FIRST TO SECOND DIALOG OF INTERACTIVE VOICE RESPONSE SYSTEM

(75) Inventors: Kurt M. Joseph, Austin, TX (US); Aaron W. Bangor, Austin, TX (US); Robert R. Bushey, Cedar Park, TX (US)

(73) Assignee: AT&T Labs, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/539,832

(22) Filed: Oct. 9, 2006

(65) Prior Publication Data

US 2007/0121895 A1 May 31, 2007

Related U.S. Application Data

(63) Continuation of application No. 10/948,507, filed on Sep. 23, 2004, now Pat. No. 7,120,244, which is a continuation of application No. 10/190,145, filed on Jul. 5, 2002, now Pat. No. 6,807,274.

(51) Int. Cl.
*H04M 3/523* (2006.01)
*H04Q 3/64* (2006.01)

(52) U.S. Cl. ............................ 379/265.01; 379/265.1; 379/265.14; 379/266.06

(58) Field of Classification Search ........... 379/265.01, 379/265.02, 265.1, 265.14, 266.01, 266.03, 379/266.05, 266.06
See application file for complete search history.

(56) References Cited

U.S. PATENT DOCUMENTS

| | | | | |
|---|---|---|---|---|
| 5,511,112 | A | 4/1996 | Szlam | |
| 5,561,711 | A | 10/1996 | Muller | |
| 5,678,002 | A | 10/1997 | Fawcett et al. | |
| 5,884,032 | A | 3/1999 | Bateman et al. | |
| 6,141,328 | A | 10/2000 | Nabkel et al. | |
| 6,157,655 | A | 12/2000 | Shtivelman | |
| 6,389,028 | B1 | 5/2002 | Bondarenko et al. | |
| 6,389,400 | B1 | 5/2002 | Bushey et al. | |
| 6,731,722 | B2 | 5/2004 | Coffey | |
| 6,807,274 | B2 * | 10/2004 | Joseph et al. | 379/265.01 |
| 7,120,244 | B2 * | 10/2006 | Joseph et al. | 379/265.01 |
| 2002/0067823 | A1 | 6/2002 | Walker et al. | |
| 2003/0007628 | A1 | 1/2003 | Vortman et al. | |

* cited by examiner

*Primary Examiner*—Harry S. Hong
(74) *Attorney, Agent, or Firm*—Jackson Walker L.L.P.

(57) ABSTRACT

A customer service call system that provides both manual (assisted by a service representative) and automated problem solving dialogs. A routing process determines which dialog is appropriate for incoming calls. The routing process determines a probability that the automated system will resolve the problem and also determines an expected hold time for the customer to reach the manual dialog. The routing process uses this information to determine how the call should be routed.

21 Claims, 2 Drawing Sheets

CALL ROUTING FROM FIRST TO SECOND DIALOG OF INTERACTIVE VOICE RESPONSE SYSTEM

RELATED APPLICATIONS

This application is a continuation of U.S. patent application Ser. No. 10/948,507, filed on Sep. 23, 2004 now U.S. Pat. No. 7,120,244. which is a continuation of U.S. patent application Ser. No. 10/190,145, filed Jul. 5, 2002, now U.S. Pat. No. 6,807,274, both of which are incorporated by reference herein.

TECHNICAL FIELD OF THE INVENTION

This invention relates to interactive voice response systems for providing customer service, and more particularly to a method for routing calls from manual to automated dialogs.

BACKGROUND OF THE INVENTION

A business or company that provides services and/or products to clients or customers may provide their customers with customer service in the form of a customer service center that handles customer requests. Customer requests may comprise requesting new products or services, getting support for a product or service, asking questions about a product or service, etc. In non-automated systems, when a customer calls the service center with a request, the service center manually routes the call to an agent that services the customer's request.

Interactive Voice Response (IVR) systems are systems that provide information in the form of recorded messages over telephone lines in response to customer input in the form of spoken words or touch tone signaling. Examples of IVR systems are those implemented by banks, which allow customers to check their balances from any telephone, and systems for providing automated stock quotes.

IVR may be used to both to acquire information from, or enter data into, a database. For example, banks and credit card companies use IVR systems so that their customers can receive up-to-date account information instantly and easily without having to speak directly to a person. An IVR system may also be used to gather information. For example, an IVR telephone survey might prompt the customer to answer questions by pushing the numbers on a touch-tone telephone.

When fully implemented, an IVR system does not require human interaction over the telephone. The customer's interaction with the database is predetermined by the extent to which the IVR system will allow the customer access to the data.

IVR systems have been successful because they generate significant cost savings due to the ability to route calls to the appropriate call center without having to incur the cost of a service representative to accomplish the routing. Once the call is routed, subsequent dialog with the customer could be additional IVR dialog or it could be assisted by a service representative. Thus, a given customer service task could be partly implemented with IVR and partly with human assistance.

The absence of a service representative can sometimes be frustrating to the customer, such as when an IVR system simply provides recorded answers that assume the customer has already correctly diagnosed a problem. On the other hand, although non-automated systems do provide a live service representative, customers can become frustrated if they are required to be put on hold to wait for service.

DETAILED DESCRIPTION OF THE INVENTION

The following description is directed to a method of overcoming the limitations of existing IVR systems. For purposes of the following description, "automated" dialogs are those that are implemented using IVR technology, typically in the form of recorded menu type selections but may be in the form of any type of prompt for interactive customer responses. The customer responses may be by touch tone, by voice recognition, TTY, some other type of telephone key pad, or some combination of these.

The method provides a customer service call system with two alternative dialogs; one partially automated and partially manual and the other fully automated. A customer who places a call to a call center begins at the partially automated dialog. When appropriate, the customer's call is routed from the partially automated dialog to the fully automated dialog. In this manner, the system balances the advantages and disadvantages IVR-implemented customer service call-centers.

Specifically, the method described herein provides customers with an IVR-type problem detection dialog with the opportunity to speak with a service representative for help in diagnosing and resolving the problem. However, the method also addresses the objections of customers to remaining in queues for long hold times by determining when they may be better served by an automated system.

For purposes of this description, customer service tasks are presented to call centers, with the customer initiating the call by telephone. Each task is deemed a "problem" to be solved, with the problem solving having three phases: detection, diagnosis, and resolution.

Figure 1:
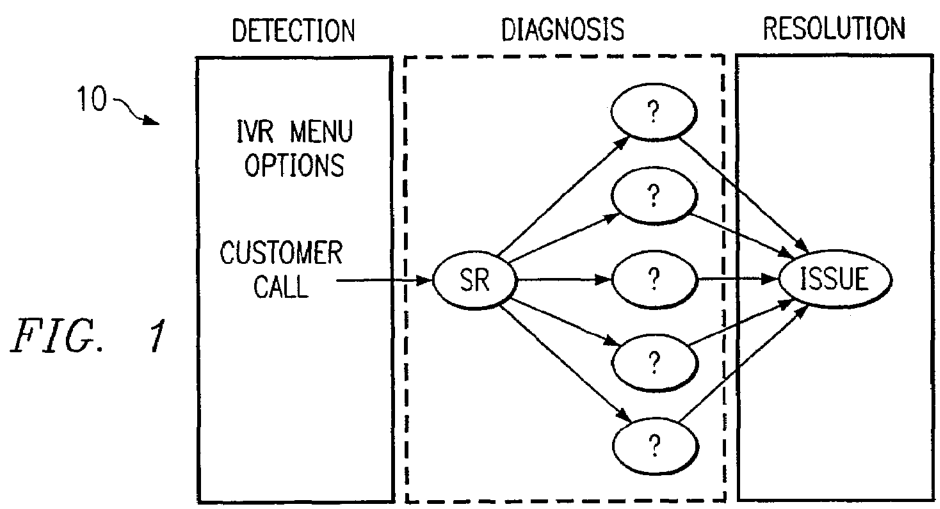
FIG. 1 illustrates a partially automated customer service dialog.

FIG. 1 illustrates a problem solving system 10, which is partially IVR-implemented. Specifically, problem detection is presented as an IVR-implemented dialog. That is, the customer identifies the problem to be solved from a menu of items. However, the diagnosis and problem resolution dialogs of system 10 are "manual", in the sense that once the specific problem is detected, a service representative (SR) is brought on-line to assist the customer with diagnosis and resolution of the problem.

In other words, system 10 requires the customer to detect a problem, then report the problem to a service representative who is trained in diagnosing the problem. The problem detection is IVR implemented in the sense that the customer responds to a menu type list of choices, by using either touch tone or voice responses. During the subsequent dialog, which is manual, the service representative asks the customer appropriate questions to aid in the diagnosis and to determine the solution.

Figure 2:
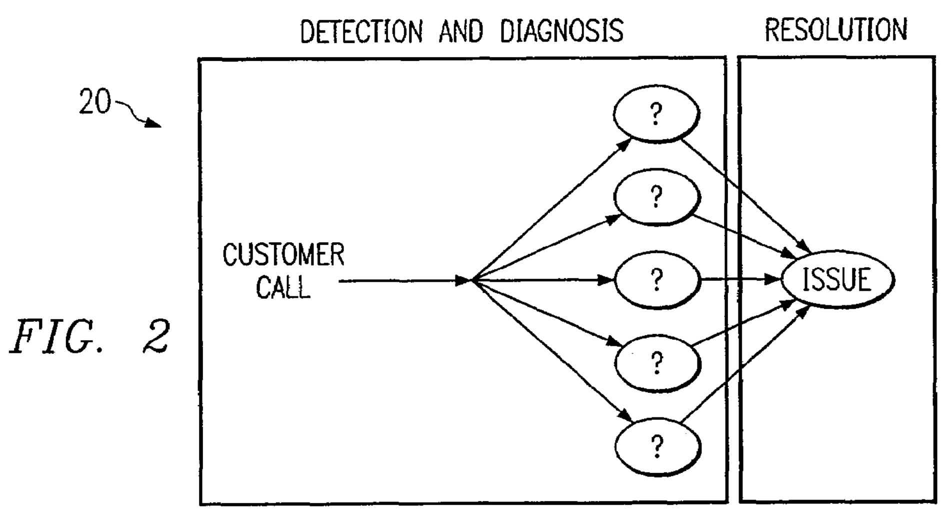
FIG. 2 illustrates a fully automated customer service dialog.

FIG. 2 illustrates a problem solving system 20 that is fully IVR implemented. The entire dialog of system 20 aids the customer in problem detection and diagnosis without any assistance from a service representative. System 20 incorporates a set of diagnostic questions, which assist the customer in mapping a detected problem to a solution. Thus, system 20 requires the customer to detect and diagnose the problem by answering queries. The queries can be in a "tree" type format, with the response to any particular question determining which query is to follow.

The diagnostic questions of system 20 are developed using the following principles. First, the questions are designed to permit the customer to successfully complete the task. Second, each question has an appropriate level of readability and comprehension. Third, the questions must be two sentences or less, and contain three instructions or less. Fourth, the questions must provide pause, repeat, backup, opt out, and get summary functionality.

Figure 3:
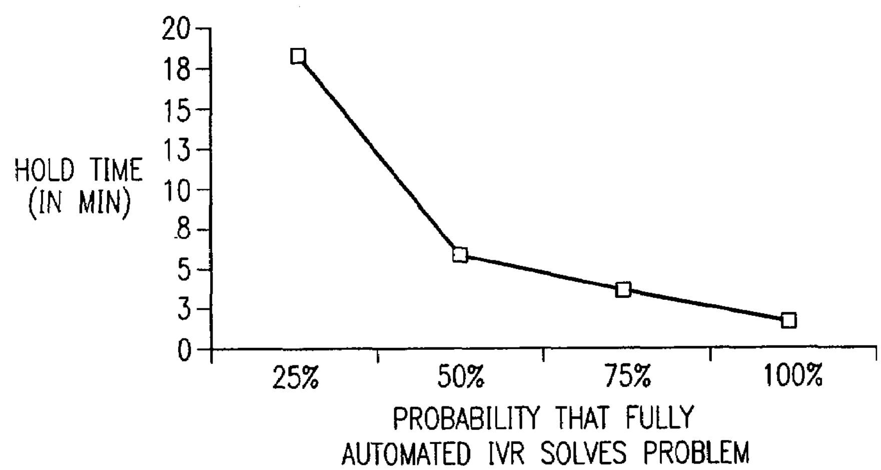
FIG. 3 illustrates the aggregated responses of customers when queried how long they would wait for service representative, given an alternative to attempt an automated problem solving system.

FIG. 3 illustrates a hold time function, derived from customer responses to a survey type query. As indicated above, one problem with manual systems, such as the manual dialog of system 10, is that customers may experience long hold times. FIG. 3 illustrates the hold time that a customer will willingly endure before speaking to a customer service representative, given the alternative of using an automated system, such as system 20. As illustrated, the more likely the automated system is to provide a solution, the less time the customer is willing to wait for a customer service representative. As explained below, FIG. 3 represents a "wait or switch" function, which may be used to determine when actual calls should be routed from a manual dialog to an automated dialog.

As an example of how the data of FIG. 3 might be obtained, a customer survey could be conducted. A sample group of customers might be presented with the following scenario: "You've called your Internet Service Provider to get help because you can't connect to the Internet. You've been put on hold and an announcement says you can either opt out to an automated problem solving system or you can wait to speak with a customer service representative. There is an [n]% chance that the APS could solve your problem. How long would you be willing to wait for a service representative before using the automated system?"

Figure 4:
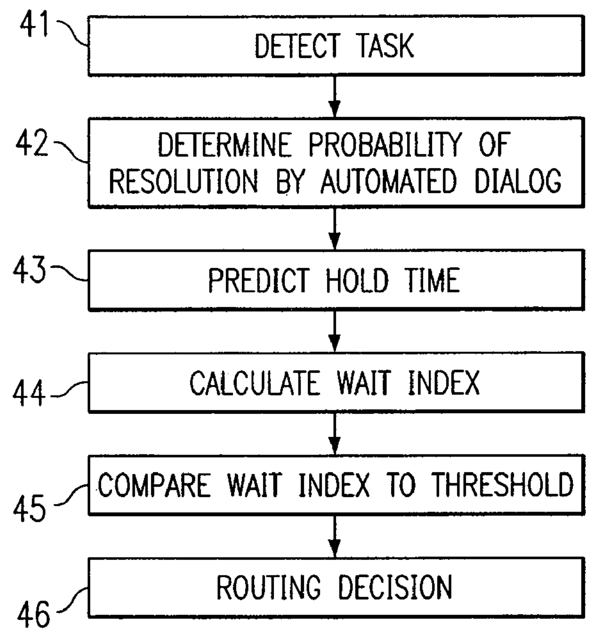
FIG. 4 illustrates a method of routing calls from a partially to a fully automated problem solving system in accordance with the invention.

FIG. 4 illustrates how the customer survey data of FIG. 3 may be used to develop a call-routing method, which permits a customer's call to be routed from a manual dialog, such as that of system 10, to an automated dialog, such as that of system 20. As explained below, the routing decision is based on two factors: an expected hold time for the manual dialog, and the probability that the automated dialog will resolve the customer's problem.

For a given call, the expected hold time and the probability of success are quantified and integrated into an algorithm, which provides an index value for the call. The index value is compared to a threshold value. Depending on the result of the comparison, the call is then left with the manual system 10 or routed to an automated system 20. Alternatively, instead of the customer's call being automatically routed, the customer could be asked to choose whether he or she desires to wait for a service representative or to use the automated system.

Referring to the specific steps of FIG. 4, Step 41 is determining the task to be performed for the customer. In the system 10 of FIG. 1, task identification is accomplished when the customer selects a menu option at the outset of the IVR problem detection dialog. In other embodiments, Step 41 could be performed using a live service representative who interacts with the customer to determine the nature of the problem.

Step 42 determines the probability that the detected task can be successfully resolved by the automated system 20. For this step, it is assumed that some basis exists for determining this probability, such as statistical data representing past calls and success rates. The task identification information is the subject of a database lookup to determine the probability that the customer will receive a satisfactory resolution from the automated system. Step 43 is determining the expected hold time for the customer. This may be accomplished by querying the call center queue size.

Step 44 is using the probability of success value (determined in Step 42) and the expected hold time value (determined in Step 43) to calculate a customer wait index. The following equation is an example of how these two values may be used in this manner:

$$\text{Wait Index}=HT+74.6\ PS-44\ PS^2-33.25,$$

where HT is the expected hold time in minutes and PS is the probability of solution.

The above function is derived from customer preference data, such the data illustrated in FIG. 3. For example, the curve of FIG. 3 can be fitted to an equation that best matches the curve, resulting in a function such as that set out above.

Step 45 is comparing the Wait Index to a threshold value. A threshold of 0 indicates that the current hold time (HT) and the current probability of solution (PS) values both match predetermined customer expectancies.

Step 46 is routing the call based on the result of the comparison. Positive values of the Wait Index indicate that a combination of HT and PS are greater than the threshold. In this case, the call is automatically routed to the automated system. Negative values of the Wait Index indicate that the combination of HT and PS are less than the threshold. In this case, the customer remains in the manual dialog queue to speak to a service representative. In either case, the customer may alternatively be queried to determine if he or she would like to be routed to the automated system.

The following example illustrates how the above-described method works for a call with HT=10 and PS=0.50.

$$\begin{aligned}\text{Wait Index} &= 10+74.6(.5)-44(.5)^2-33.25\\ &= 10+37.3-11-33.25\\ &= 3.05\end{aligned}$$

This positive value results in the call being routed to the automated system, or the customer being queried about remaining in the queue.

The following example illustrates how the method works for a call with HT=1 and PS=0.50.

$$\begin{aligned}\text{Wait Index} &= 1+74.6(.5)-44(.5)^2-33.25\\ &= 1+37.3-11-33.25\\ &= -5.95\end{aligned}$$

This negative value results in the call remaining in the queue or the customer being queried about opting for the automated system.

In accordance with the above-described method, when hold times do not meet customer expectancies, customers may be automatically routed to an automated problem system 20, which can assist in problem diagnosis. The use of the wait index, with thresholds based on customer data may also be used to give the customer control over the decision to opt for the automated system.

Figure 5:
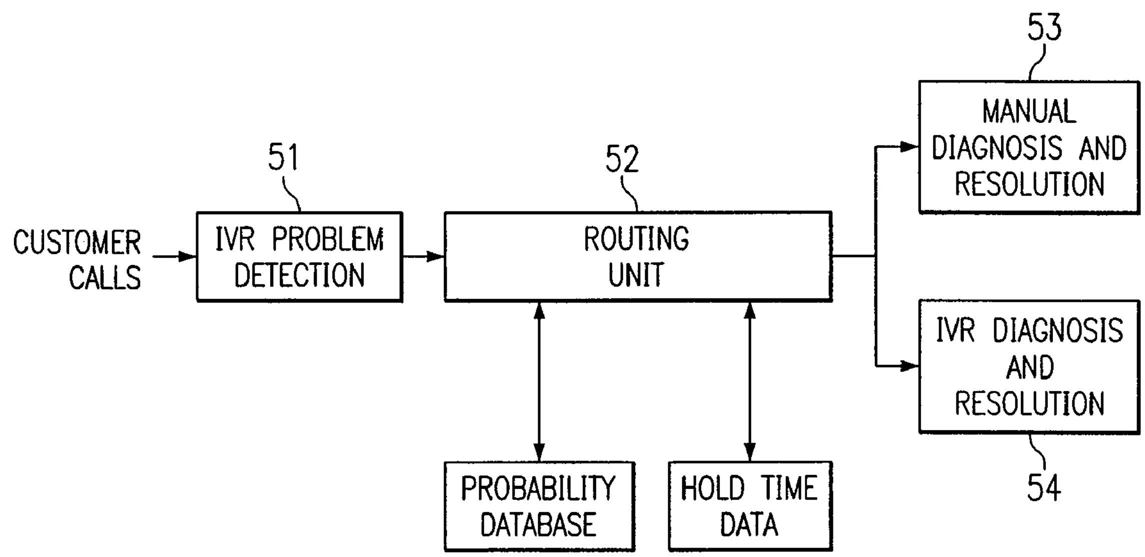
FIG. 5 illustrates a customer service call system having a routing unit in accordance with the invention.

FIG. 5 represents a customer call center system in accordance with the invention. The customer initially interacts with an IVR problem detection dialog 51, such as the detection dialog of FIG. 1. In other embodiments, dialog 51 could be a manual dialog, in which the customer interacts with a service representative. Once the task to be solved is determined, a routing unit 52 is programmed to calculate a wait index, compare the index to a threshold, and obtain a routing decision, as described above in connection with FIG. 4. Depending on the routing decision, the call is routed to the manual system 53 where the customer interacts with a live service representative or to the automated system 54 where the customer interacts with an IVR dialog. It is assumed that each of the elements of FIG. 5 is implemented with appropriate hardware and software. The routing unit is implemented with computer programming and databases appropriate for performing the above described functions. Suitable implementations of the various dialogs are known in the art or capable of being developed.

OTHER EMBODIMENTS

Although the present invention has been described in detail, it should be understood that various changes, substitutions, and alterations can be made hereto without departing from the spirit and scope of the invention as defined by the appended claims.

What is claimed is:

1. A method of handling a call from a caller, comprising:

detecting a task;

assigning to the task a probability indicative of an estimate of the likelihood of completing the task via an automated system;

assigning to the task a hold time indicative of an estimate of a duration until a customer service representative is available to talk to the caller; and routing the call either to an automated system or to a customer service representative based on a combination of the probability and the hold time.

2. The method of claim 1, wherein said detecting is performed by the customer's selection from an interactive voice response menu.

3. The method of claim 1, wherein said assigning of said probability is performed by accessing data that is representative of previous calls.

4. The method of claim 1, wherein said assigning of said hold time is performed by accessing data representing a current queue of the call system.

5. The method of claim 1, wherein said routing comprises routing the call to the automated system based on data indicative of hold time thresholds for various values of said probability.

6. The method of claim 5, wherein said data comprises caller survey data.

7. The method of claim 5, wherein said routing comprises routing the call to the automated system when said hold time exceeds said hold time threshold for said probability.

8. A call handling system, comprising:

a task detector operable to identify a task associated with a call from a caller; and a call router operable to:

index a probability database using the identified task to retrieve a probability associated with the identified task;

estimate a hold time; and route the call to one of at least two call handling resources based on said probability and said hold time.

9. The system of claim 8, wherein said probability is indicative of a probability of successfully resolving the identified task via a first call handling system.

10. The system of claim 9, wherein the first call handling system is an interactive voice response call handling system.

11. The system of claim 8, wherein the task detector is an interactive voice response task detector.

12. The system of claim 8, further comprising a first database, accessible by the routing unit including data indicative of past handling of calls via a first of the at least two call handling resources.

13. The system of claim 8, wherein the routing unit predicts the hold time by accessing data representing a current queue of the call system.

14. The system of claim 8, wherein the routing unit automatically routes the call.

15. The system of claim 8, wherein the routing unit queries the caller to accept a proposed routing decision.

16. A routing system for customer service system, which has alternative manual and automated dialogs for solving customer problems, comprising.

17. A service, comprising:

enabling a call center to determine a task associated with an incoming call from a caller;

enabling the call center to estimate a probability of successfully completing the task via an automated call handling module and to estimate a hold time associated with an customer service representative (CSR)-based module; and enabling the call center to route the call to either the automated call handling module or to the CSR-based module based on the estimated probability and the estimated hold time.

18. The service of claim 17, wherein said enabling said call center to determine comprises enabling said call center to determine said task from the caller's response to an interactive voice response menu.

19. The service of claim 17, wherein said enabling said call center to estimate said probability includes enabling said call center to estimate said probability by accessing data indicative of success of previous calls.

20. The service of claim 17, wherein said enabling said call center to estimate said hold time includes enabling said call center to access data representing a current queue of the call system.

21. The service of claim 17, wherein enabling said caller center to rout comprises enabling the call center to rout to the automated call handling module, based on data indicative of hold time thresholds for various values of said probability, when a hold time exceeds a hold time threshold corresponding to said probability.

* * * * *